United States Patent [19]

Cornelison

[11] Patent Number: 5,395,600
[45] Date of Patent: Mar. 7, 1995

[54] CORRUGATED THIN METAL MONOLITH CONVERTER

[75] Inventor: Richard C. Cornelison, Hiram, Ohio

[73] Assignee: W. R. Grace & Co.-Conn., New York, N.Y.

[21] Appl. No.: 90,737

[22] Filed: Jul. 13, 1993

[51] Int. Cl.⁶ .................... B01D 53/36; B01J 35/04; F01N 3/28

[52] U.S. Cl. .................... 422/180; 55/492; 55/497; 55/521; 55/525; 60/299; 422/222; 502/439; 502/527

[58] Field of Search ............... 422/177, 179, 180, 211, 422/221, 222; 55/492, 497, 521, 525, DIG. 30; 60/299, 300, 301; 502/439, 527, 349, 350; 423/213.5

[56] References Cited

U.S. PATENT DOCUMENTS

| | | | |
|---|---|---|---|
| 3,372,533 | 3/1968 | Rummel | 55/521 X |
| 4,307,068 | 12/1981 | Matsumoto et al. | 422/180 X |
| 4,324,701 | 4/1902 | Honda et al. | 422/180 X |
| 4,685,944 | 8/1987 | Allan et al. | 55/497 X |
| 4,711,009 | 12/1987 | Cornelison et al. | 422/180 X |
| 4,869,738 | 9/1989 | Alcorn et al. | 55/267 X |
| 4,942,020 | 7/1990 | Whittenberger et al. | 422/180 |
| 4,987,034 | 1/1991 | Hitachi et al. | 422/180 X |

FOREIGN PATENT DOCUMENTS 2065494 12/1979 United Kingdom .

Primary Examiner—Robert J. Warden
Assistant Examiner—L. M. Crawford
Attorney, Agent, or Firm—Beverly K. Johnson

[57] ABSTRACT

A multicellular monolith converter body having a plurality of corrugated thin metal sheets or strips in alternating relation with a thin wire mesh or frame, and which monolith has a cell density up to 100 cells per square inch. These monoliths are useful under conditions where back-pressure is a critical factor, e.g., natural draft exhaust applications. These devices may have corrugated thin metal sheets coated with a refractory metal oxide, e.g., alumina, with or without a noble metal catalyst.

14 Claims, 2 Drawing Sheets

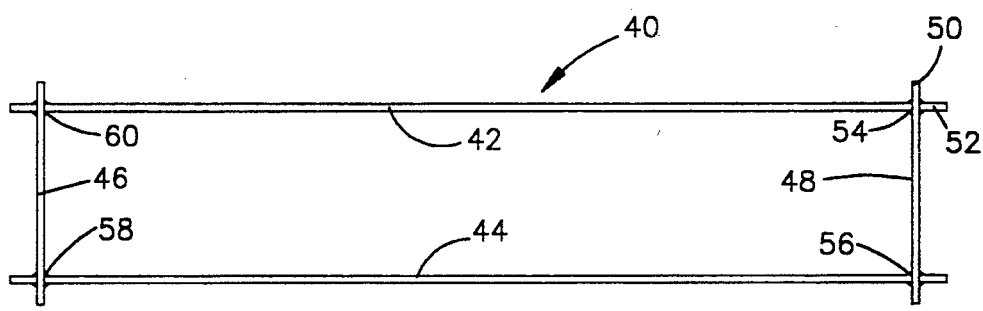
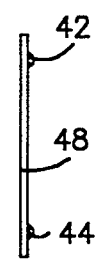
Fig.4  Fig.5
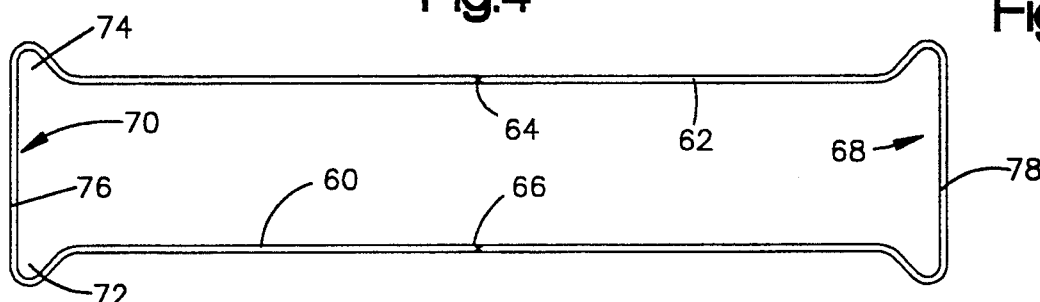
Fig.6
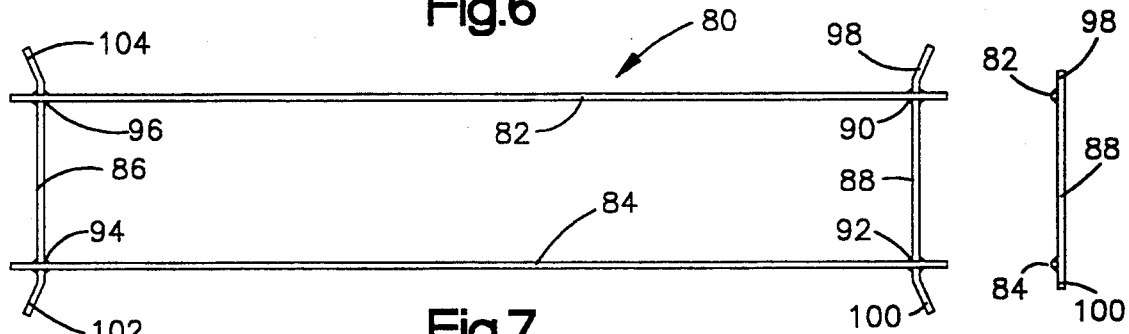
Fig.7  Fig.8
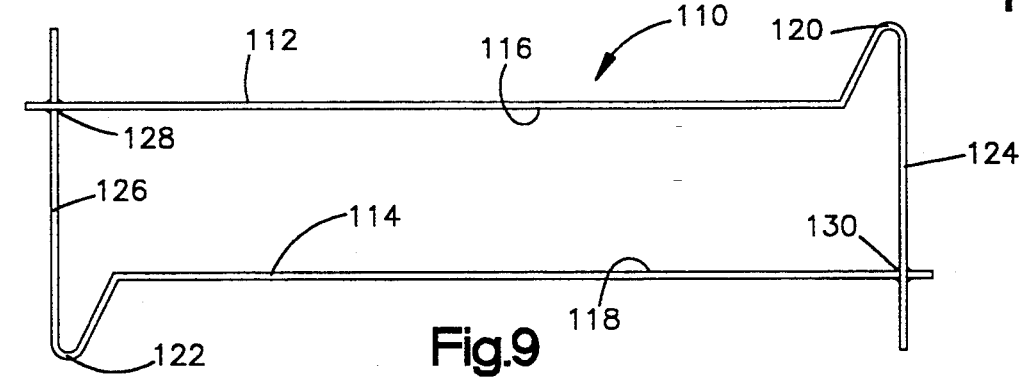
Fig.9
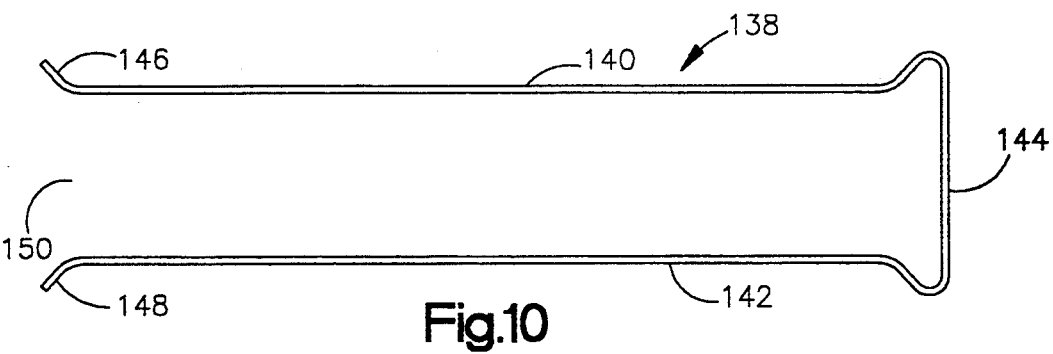
Fig.10

CORRUGATED THIN METAL MONOLITH CONVERTER

This invention relates to a multicellular monolith converter, and more particularly to a converter for removing pollutant materials from various exhaust gases, e.g., kitchens, refineries, chemical plants, gas turbine engines, internal combustion engines, stationary or mobile, of the compression ignited and spark ignited types, flame arresters, diffusers, flow straighteners, etc., which may use these devices to advantage.

The multicellular devices hereof are made from a substrate of corrugated thin metal strips, that is, metal sheets, or strips which are from 0.001" to 0.125" thick. The devices hereof also have relatively large cells, i.e., coarser than about 20 cells per square inch, up to 100 cells per square inch. These structures lend themselves to mass production techniques, including web processing, and can readily be assembled into various shapes and secured in housings to provide an end product.

The devices hereof are comprised of a very coarse mesh of fine-gauge wire, or narrow ribbons of metal, or a preformed wire frame, interposed between successive layers of corrugated thin metal laminations in alternating relation therewith. The mesh or frame prevents nesting of adjacent corrugated thin metal laminations, whether the honeycomb monolith is wound, as in an S-shape, a spiral, or layered, or folded into a rectangular, round, triangular, or oval shape. The devices hereof are characterized by low back pressure and structural integrity. They are especially well suited for use in natural draft exhaust applications or under conditions where back pressure is a critical factor, whether in a flow path of a gaseous or a liquid medium.

Another advantage of the invention is that the wire frame does not occlude the catalytically active outer surface of the peaks of the corrugated thin metal strips nearly as much as would a flat intermediate lamination.

The laminations and screen or mesh are normally metallic. However, in low temperature regimes under about 300 F., composite materials and polymers may be used.

BACKGROUND OF THE INVENTION AND PRIOR ART

This invention will be described in connection with apparatus used primarily for emission control useful in natural draft exhaust stacks. Heretofore, catalytic converters for natural draft applications have been made of corrugated thin metal strips laminated with flat strips to prevent nesting of the corrugations of one layer from nesting into the corrugations of an adjacent or contiguous layer. The flat on corrugated configuration has the effect of multiplying the cell density by two and thus increases back-pressure. It is a primary purpose of the present invention to provide a monolith with structural integrity at very low cell densities, e.g., less than about 100 cells/square inch. Low back-pressure in converters is essential in natural draft applications. Further, low back pressure reduces the operating cost of forced draft fans in the exhaust stream.

The corrugated thin metal strips of the present invention are readily produced by a process such as the one described in U.S. Pat. No. 4,711,009 date Dec. 8, 1987 to Cornelison et al. Here, a continuous strip of thin metal foil is passed between partially enmeshed corrugating gears to corrugate the foil. In the preferred embodiments, the corrugations are straight-through and normal to the longitudinal marginal edges of the strip. A coating of a refractory metal oxide may be applied by a wash-coating technique such as described in said patent, and a noble metal catalyst applied thereover, also as described therein. After drying and calcining, the strip may be further treated to cut strips of predetermined length, or to bend and accordion fold the strip. In the present case, it is preferred to cut the strips to a predetermined length and omit the remaining steps of the process as described in the aforesaid patent.

The devices of the present invention are preferably not electrically heated, although for certain applications they may be electrically heatable.

While in most cases, ordinary stainless steel may be used to form the corrugated thin metal strips, and the wire frames of the present invention, certain applications of the devices hereof will require a "high" (1500 F. to 2300 F.) temperature resistive, oxidation resistant metal alloy with low creep properties at operating temperatures. One such alloy is "ferritic" stainless steel. Suitable "ferritic" stainless steel alloys are disclosed in U.S. Pat. No. 4,414,023 dated Nov. 8, 1983 to Aggen. A specific ferritic stainless steel alloy contains 20% chromium, 5% aluminum, and from 0.002% to 0.05% of at least one rare earth metal selected from cerium, lanthanum, neodymium, yttrium, and preseodymium, or a mixture of two or more of such rare earth metals, balance iron and trace steel making impurities. A ferritic stainless steel is commercially available from Allegheny Ludlum Steel Co. under the trademark "Alfa IV."

Another metal alloy useful herein is identified as Haynes 214 alloy, which is also commercially available. This alloy and other nickeliferous alloys are described in U.S. Pat. No. 4,671,931 dated Jun. 9, 1987 to Herchenroeder et al. These alloys are characterized by high resistance to oxidation and creep. A specific example contains 75% nickel, 16% chromium, 4.5% aluminum, 3% iron, optionally trace amounts of one or more rare earth metals except yttrium, 0.05% carbon and steel making impurities. Haynes 230 alloy, also useful herein, has a composition containing 22% chromium, 14% tungsten, 2% molybdenum, 0.10% carbon, and a trace amount of lanthanum, balance nickel. The ferritic stainless steels and the Haynes alloys 214 and 230 are examples of high temperature resistive, oxidation or corrosion resistant metal alloys. For most applications, these and other alloys alloys are used as "thin" metal strips from 1 to 12 or more inches wide, and having a thickness of from about 0.001" to about 0.05" and preferably from 0.0015" to 0.003".

BRIEF STATEMENT OF THE INVENTION

Briefly stated,. the present invention is a multicellular monolith converter body comprising a plurality of corrugated thin metal sheets or strips in alternating relation with a thin wire mesh or frame, and having a cell density of less than 100 cells per square inch, e.g., less than 40 cells per square inch. In most embodiments, the plurality of corrugated thin metal strips are contained in a frame, usually rectangular, e.g., a square 18" on a side. The thin wire mesh or frame has a void fraction or open area of at least about 95%.

BRIEF DESCRIPTION OF THE DRAWINGS

The invention may be better understood by having reference to the annexed drawings showing a preferred embodiment of the invention and wherein:

FIG. 4 is a plan view of a wire frame useful herein.

FIG. 5 is an end view of the wire frame shown in FIG. 4.

FIG. 6 is a plan view of another form of wire frame useful herein.

FIG. 7 is a plan view of still another form of wire frame useful herein.

FIG. 8 is an end view of the wire frame shown in FIG. 7.

FIG. 9 is a plan view of still another form of wire frame useful herein.

FIG. 10 is a plan view of still another form of wire frame useful herein.

DETAILED DESCRIPTION OF THE DRAWINGS

Figure 1:
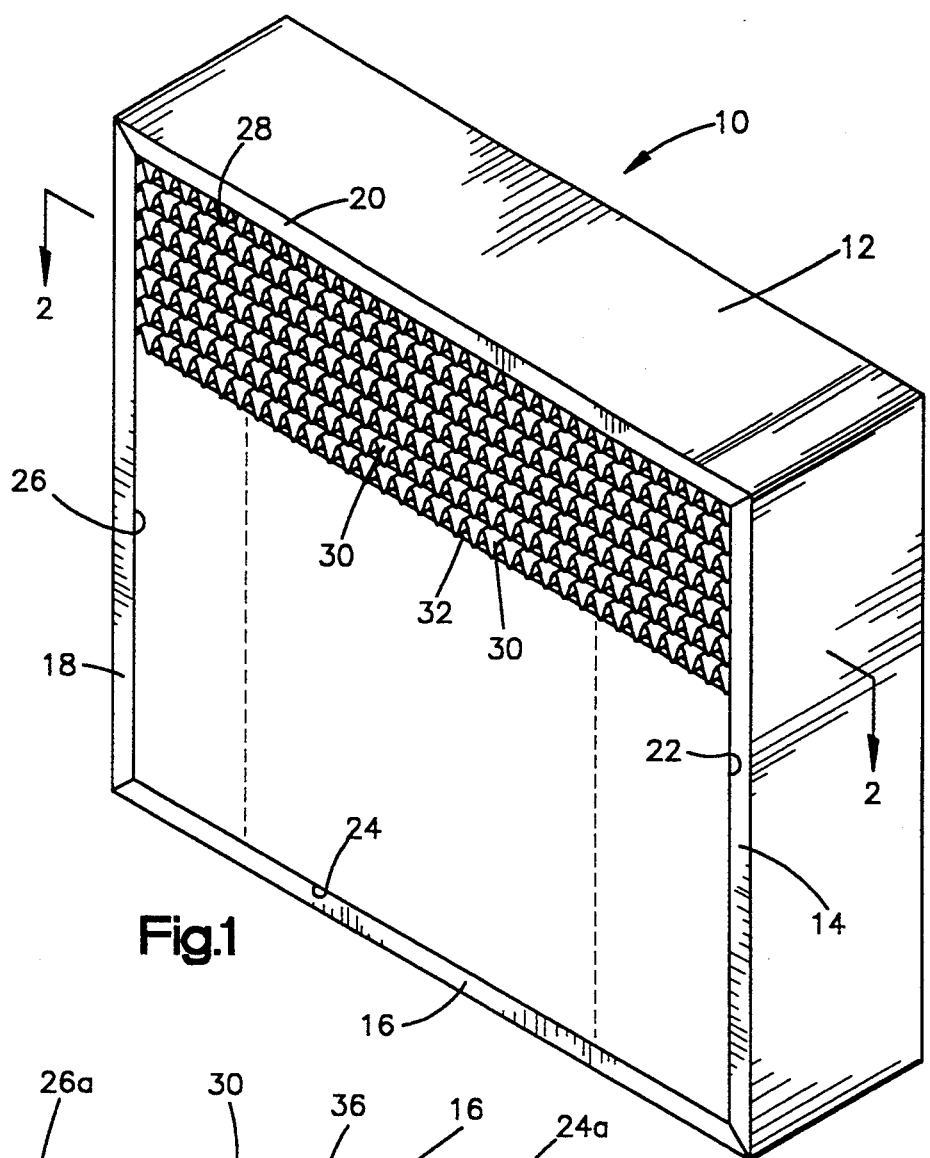
FIG. 1 is a perspective view of a multiceluler monolith converter body in accordance herewith.

As indicated above, the present invention is in a multicellular converter body, FIG. 1 being a typical embodiment. Of course, the converter bodies hereof may take different forms, and be used in different applications for treating gases or liquids. However, a principal use of the devices hereof is in connection with the treatment of exhaust gases by natural draft, e.g., exhaust from potato chip production, or lightly forced draft, e.g., from fast food establishments. The devices hereof may contain a catalyst or not as the circumstances require. Also, the devices hereof may be heated by any of a number of means, including electrical means, or by warm air in the exhaust draft.

Figure 2:
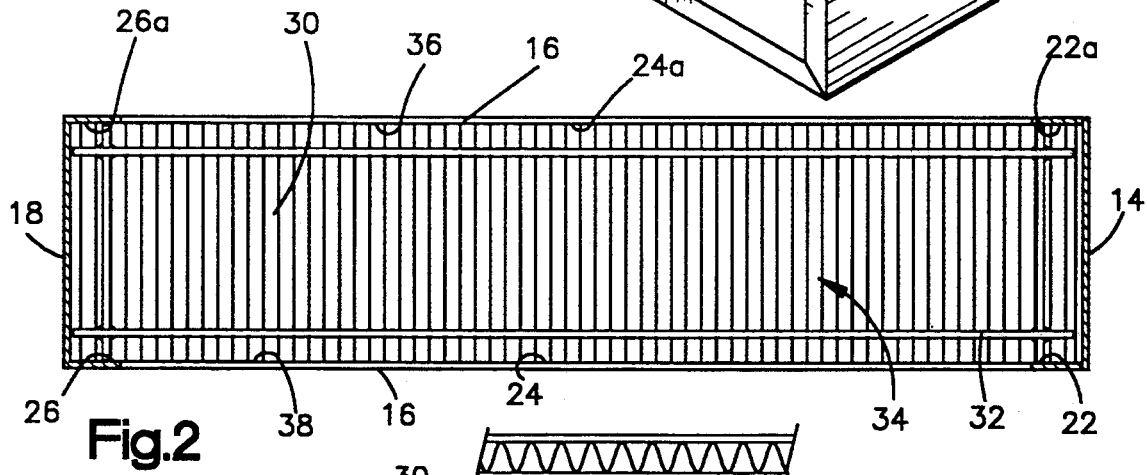
FIG. 2 is a plan view of a corrugated thin metal strip with a wire frame overlayed as it appears in the plane indicated by the line 2—2 in FIG. 1.

In its simplest form, the devices hereof comprise, a thin metal corrugated strip and a wire frame, a completed device also including a housing or surrounding frame. The thin metal corrugated strip may have a coating of a refractory metal oxide, such as gamma-alumina, or gamma-alumina/ceria, titania, titania/alumina, titania/ceria, zirconia, etc. and may optionally include a catalyst, such as a noble metal catalyst, e.g., palladium, platinum, rhodium, or mixtures of two or more of such metals, or gold, or vanadia. Alternatively, the thin metal strips may be coated with a hydrocarbon adsorber/desorber, such as a zeolite silica gel or amorphous carbon. Thus, there is shown in FIG. 1, a device 10 hereof having a rectangular housing 12. One or more of the devices 10 may be placed in a gas stream to be treated. The housing 12 is composed of generally U-shaped channels 14, 16, 18 and 20 having marginal flanges 22, 24, 26 and 28 as they appear on the front side in FIG. 1. In FIG. 2, the orthogonally related flanges 26a, 24a, and 22a are shown.

Contained within the housing 12 is a series of corrugated thin metal strips 30 in alternating relation with a series of wire frames 32. The strips 30 are corrugated by passing a thin metal strip between corrugating roller gears as described, for example in the aforesaid U.S. Pat. No. 4,711,009. The corrugations 30 are preferably "straight-through", that is, the corrugations 30 run directly along a straight line from one longitudinal marginal edge 36 of the thin metal strip 34 to the opposite longitudinal marginal edge 38 of the thin metal strip 34, preferably at a 90 degree angle to the edges 36 and 38. This structure provides minimum back pressure. Disposition of the corrugations 30 at a slight angle to the marginal edges of the strip 36 and 38 in FIG. 2 may be found desirable where greater contacting of pollutant molecules on the catalyst surface area outweighs back pressure.

Figure 3:
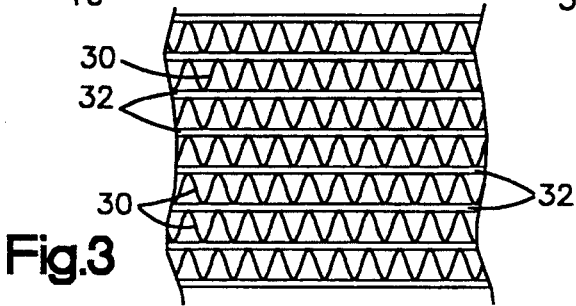
FIG. 3 is a view on an enlarged scale showing the alternating layering of corrugated thin metal strips and a wire frame from the open ends of the cells.

FIG. 3 is a front view on an enlarged scale showing the openings of the cells, and the spacing effected by the wire frame 32. But for the frames 32, the corrugated thin metal strips 30 would mesh together and block the flow of fluid through the device.

FIGS. 4 and 5 show a plan view and an end view, respectively of a wire frame generally indicated at 40. The frame 40 is composed of two longitudinally extending members 42 and 44, and two cross members 46 and 48. The cross members 46 and 48 are secured to the longitudinally extending members by any suitable means, e.g., as by welding at points 54, 56, 58, and 60. The extensions 50 and 52, for example, at each corner of the frame, extend behind the flanges, for example upstanding flanges 26 and 26a of the frame 12 (FIG. 1) in FIG. 2, and 22, 24, 26, and 28 of the housing or frame 12 in FIG. 1.

FIG. 6 shows another form of wire frame for positioning between corrugated thin metal strips, e.g., strip 30 in FIG. 1. Here, two identical bent wire frames 60 and 62 are welded together at the proximal ends of the wire frame of FIG. 6 at points 64 and 66. The distal extremities 68 and 70 of the wire frame of FIG. 6 are flared as at 72 and 74, and joined together by the integral cross members 76 and 78, respectively. Thus, the frame of FIG. 6 is composed of two generally U-shaped members joined, as by welding at the free ends thereof, at 64 and 66.

FIGS. 7 and 8 show a plan view and an end view, respectively of another form of wire frame useful herein for positioning between corrugated thin metal strips herein. Thus, there is shown in FIG. 7 a wire frame generally indicated at 80 composed of two longitudinally extending members 82 and 84, and cross members 86 and 88 at each end. The cross members 86 and 88 are welded, as at 90, 92, 94 and 96 to form a rectangle. The free ends 98 and 100 of the cross member 88 are bent outwardly, as are the free ends 102 and 104 of the cross member 86.

FIG. 9 shows still another form of wire frame useful herein between corrugated thin metal sheets. The wire frame generally indicated at 110 is composed of two bent wire pieces 112 and 114. Each bent wire piece 112 and 114 has a longitudinally extending portion 116 and 118, respectively, terminating in outwardly extending hairpin bend 120 and 122 with a longer leg 124 and 126, respectively, serving as a cross member for the wire frame 110. The bent wire pieces 112 and 114 are actually identical in form, but laid out as shown in FIG. 9 and welded as at 128 and 130 to form a rectangular frame for insertion between corrugated thin metal strips 30 as above indicated and as shown in the drawings. Here, only two weldments are required.

FIG. 10 shows still another form of wire frame having no weldments. The wire frame, generally indicated at 138, is closed at one end and open at the other. Thus, there are shown longitudinally extending wire frame members 140 and 142 joined at the closed end by a transverse member 144. The opposite ends 146 and 148 diverge and form the open end 150. This wire frame, like the others is adapted for insertion between corrugated thin metal strips 30 as above indicated and as shown in the drawings.

Although there have been shown the preferred rectangular wire frames in the annexed drawings, other geometric configurations, e.g., parallelograms, triangles, curved forms, circular sectors, etc., may also be used herein.

What is claimed is:

1. A multicellular monolith converter body comprising a stack of (a) a plurality of corrugated thin metal sheets in alternating contiguous relation with (b) a plurality of discrete thin metal wire mesh, screen, ribbon or frame elements, each metal sheet from (a) and each thin wire mesh, screen, ribbon or frame element of (b) together defining a plurality of cells, and having a cell density of less than 100 cells per square inch.

2. A multicellular monolith converter body comprising (a) a peripheral metal frame surrounding a stack of (b) a plurality of corrugated thin metal sheets in alternating contiguous relaton with (c) a plurality of discrete thin metal wire mesh, screen, ribbon, or frame, said thin wire mesh, screen, ribbon or frame having a void fraction or open area of at least about 95%, elements (b) and (c) defining cells and having a cell density of less than 100 cells per square inch.

3. A converter body as defined in claim 2 wherein the frame (a) is rectangular.

4. A converter body as defined in claim 2 wherein the corrugated thin metal sheets are coated with a refractory metal oxide.

5. A converter body as defined in claim 4 wherein the corrugated thin metal sheets are coated with a refractory metal oxide on both sides.

6. A converter body as defined in claim 4, wherein the corrugated thin metal sheets also have supported on at least one surface thereof at least one noble metal catalyst.

7. A converter body as defined in claim 6 wherein the noble metal catalyst is selected from the group consisting of palladium, platinum, rhodium, ruthenium, and mixtures of at least two of such metals.

8. A converter body as defined in claim 4 wherein the refractory metal oxide coating comprises a refractory metal oxide selected from the group consisting of alumina, gamma-alumina, ceria, titania and mixtures of at least two of such oxides.

9. A converter body as defined in claim 8 wherein the refractory metal oxide coating comprises titania.

10. A converter body as defined in claim 2 wherein the frame (a) is formed of a series of connected U-shaped channels defining an enclosed cross-sectional geometric configuration.

11. A converter body as defined in claim 10 wherein the enclosed cross-sectional geometric configuration is rectangular.

12. A converter body as defined in claim 10 wherein the enclosed cross-sectional geometric configuration is a square.

13. A converter body as defined in claim 2 wherein the frame (a) has orthogonally related flanges along each of its longitudinally extending marginal edges.

14. A converter body as defined in claim 13 wherein the frame (a) overlaps the edges of the stack.

* * * * *